United States Patent Office 2,876,886
Patented Mar. 10, 1959

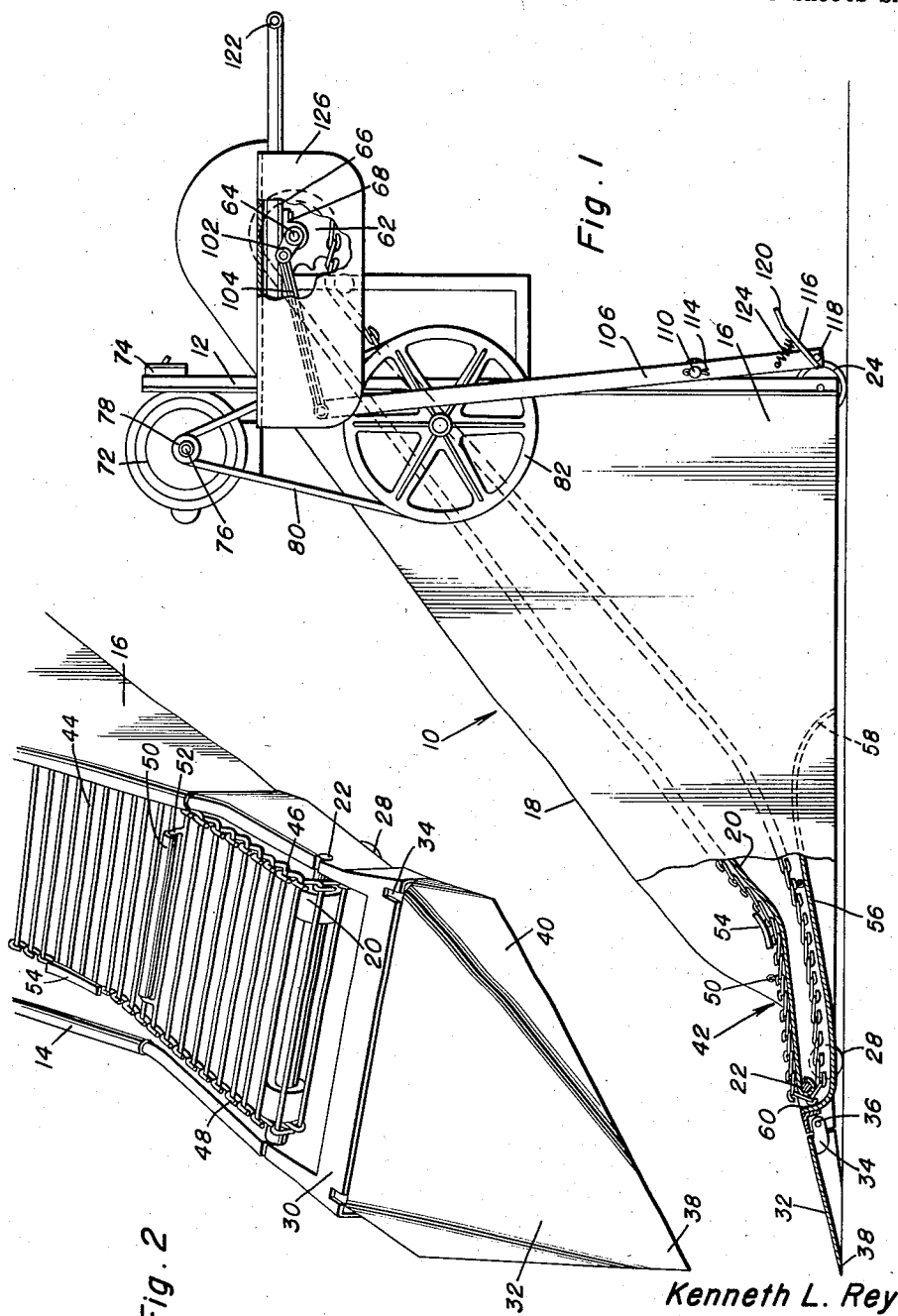

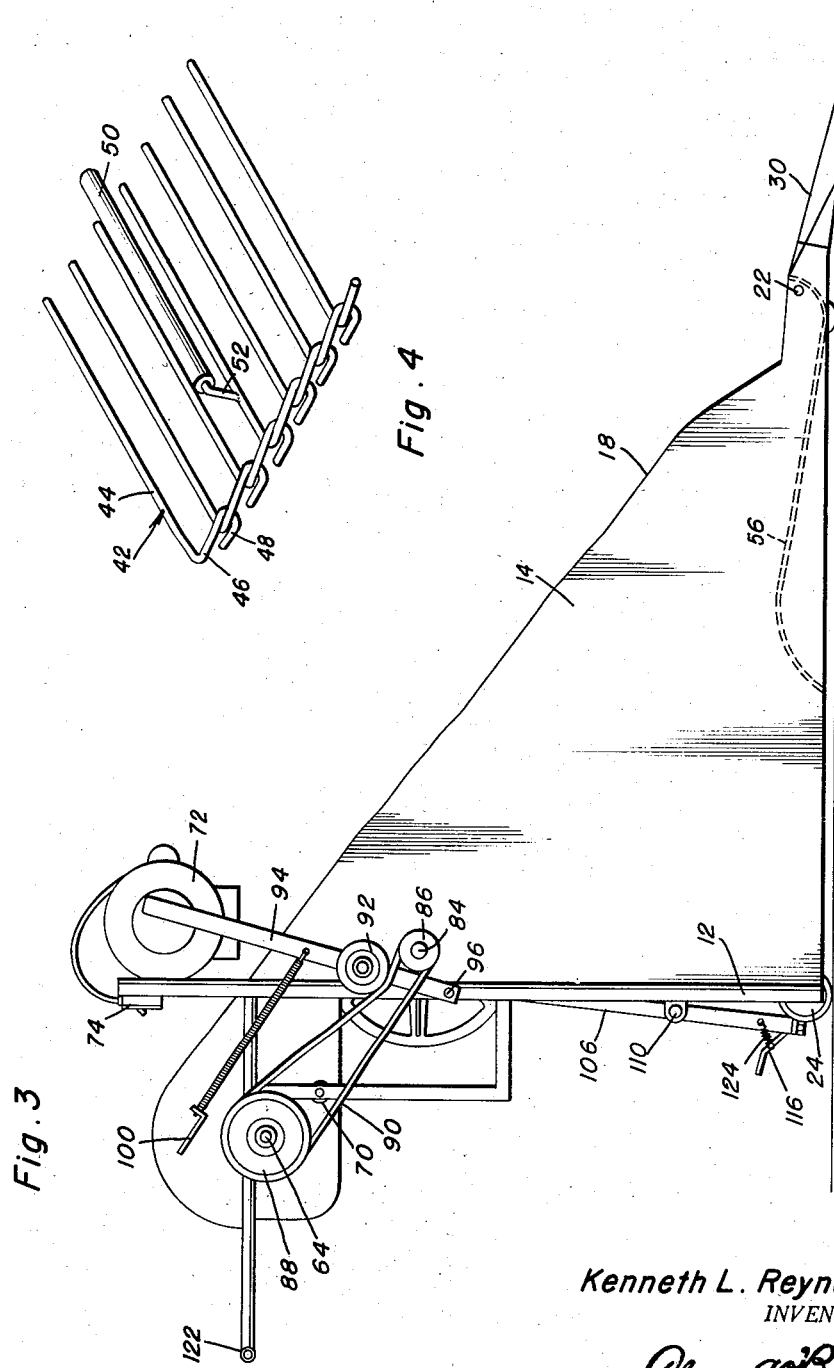

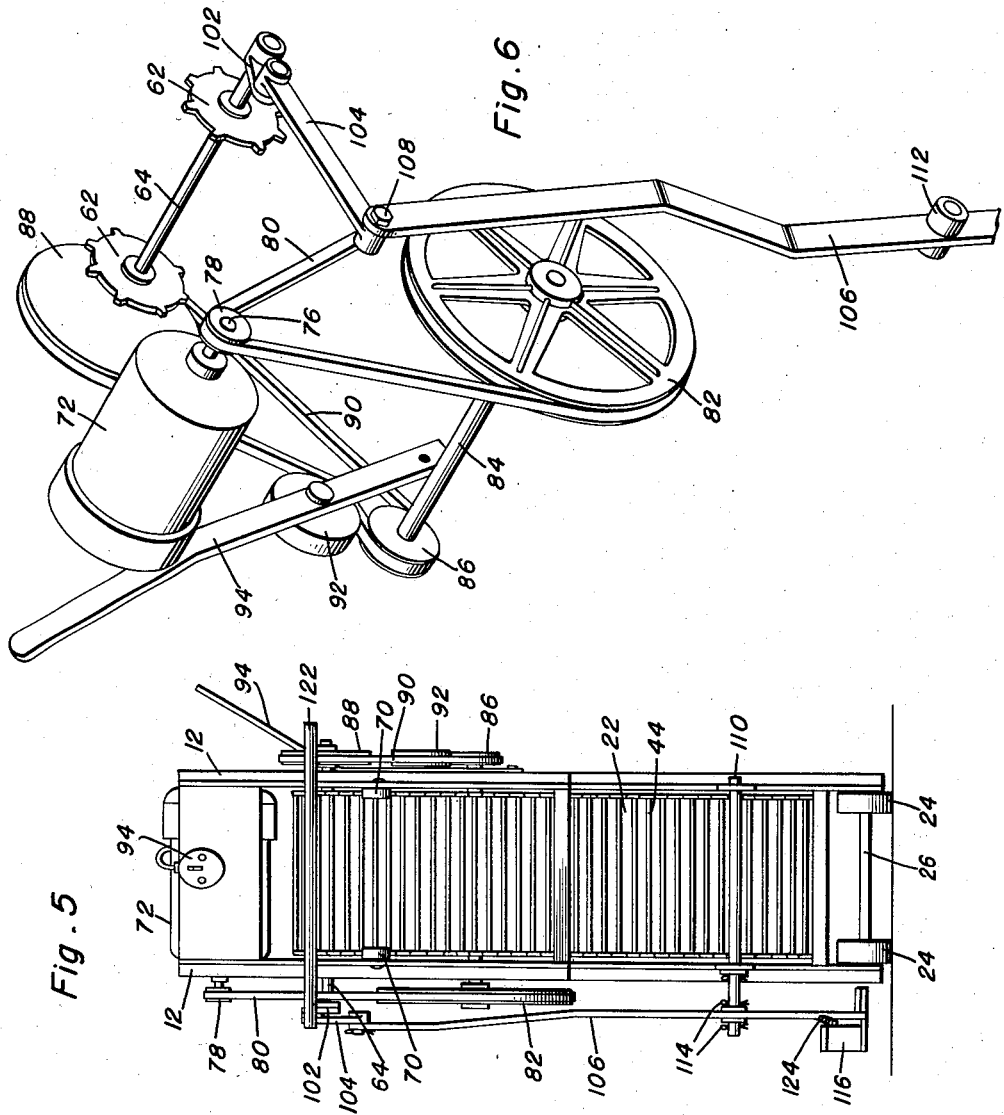

2,876,886

VEGETABLE SHOVEL AND CONVEYOR CONSTRUCTION

Kenneth L. Reynolds, Fort Fairfield, Maine

Application May 21, 1956, Serial No. 586,145

7 Claims. (Cl. 198—7)

This invention generally relates to a material conveying device and more particularly to a vegetable shovel and conveyor construction which is primarily adapted to remove potatoes or similar vegetables from a flat supporting surface or floor and to load the same into barrels, sorting or grading machines or other containers without damage.

An object of the present invention is to provide a conveyor construction incorporated with a relative thin shovel or plate at the forward end thereof which acts as a guide for positioning the vegetables being conveyed onto the lower horizontal end portion of an endless conveyor so that the vegetables may be raised along the inclined portion of the conveyor to an elevated position for permitting the dumping of such vegetables or potatoes into a sack or other container or into a grading machine.

Another important object of the present invention is to provide a vegetable shovel and conveyor as set forth in the preceding object and also to provide a novel method of propulsion of the conveyor and also the entire framework for imparting vibration and forward motion to the device in such a manner that the potatoes or vegetables may be loaded rapidly onto the conveyor without injury.

Other objects of the present invention will reside in its simplicity of construction, ease of operation, adaptation for its particular purposes and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the vegetable shovel and conveyor of the present invention with a portion of the front end thereof being broken away illustrating details of construction thereof;

Figure 2 is an enlarged perspective view of the lower front portion of the device illustrating the details of the shovel guide;

Figure 3 is a side elevational view of the construction of the present invention taken from the other side of the device from Figure 1 and illustrating certain details of construction of the drive and clutch mechanism;

Figure 4 is an enlarged perspective view of a fragment of the endless conveyor chain illustrating the details of construction thereof;

Figure 5 is a rear elevational view of the conveying mechanism; and

Figure 6 is a perspective schematic view illustrating the power transmission construction for driving the conveying apparatus and also for vibrating the machine forwardly.

Referring now particularly to the drawings, the numeral 10 generally designates the vegetable shoveling and conveying apparatus of the present invention which includes vertical frame rails 12 at the rear edge thereof with a pair of side plates 14 and 16 extending forwardly therefrom and terminating in upper inclined edges 18. Interconnecting the side walls 14 and 16 is a conveyor bottom 20 which extends from a transverse rod 22 at the lower front end of the side plates 14 and 16 rearwardly in a generally horizontal manner and then upwardly in an inclined manner in general parallel relation to the upper inclined edges 18 of the side walls 14 and 16.

The rear end of the apparatus 10 is supported by a pair of wheels 24 mounted on a transverse axle 26 and the front end of the apparatus 10 is supported in substantially the same manner on a pair of wheels 28.

As illustrated in Figure 2, the side plates 14 and 16 are interconnected at their upper edges by a generally horizontal flange 30 to which is pivotally attached a forwardly extending guide shovel or plate 32 that is provided with rearwardly extending lugs 34 hingedly attached to the side walls 14 and 16 by hinge pins 36 whereby the shovel 32 may slidingly engage a supporting surface. The front end of the shovel 32 is pointed substantially as designated by the numeral 38 with the outer edges thereof generally flared downwardly as designated by the numeral 40 thereby forming a guide for urging potatoes or similar vegetables upwardly along the inclined upper surface of the shovel 32 over the horizontal flange 30 and onto a conveyor generally designated by the numeral 42.

The conveyor 42 includes an elongated endless conveyor chain including a plurality of U-shaped rod members generally designated by the numeral 43 and including a bight portion 44 and a pair of leg portions 46 which terminate in hooked ends 48 which lie in substantially the same plane as the legs 46 in that the hooked ends 48 turn downwardly and rearwardly. The legs 46 are slightly inwardly converging so that the hooks 48 will engage the juncture between the bight portion 44 and the legs 46 of an adjacent rod member 43 thereby forming an endless conveyor chain having spaced transverse portions formed by the bight portions 44 which will permit and facilitate the carrying of vegetables along the upwardly inclined bottom member 20. Secured to certain of the bight portions 44 is a transverse cylindrical rod or slat 50 mounted in spaced relation by attaching rods 52 whereby the slats or transverse cylindrical members 50 prevent potatoes or similar vegetables from rolling back down the incline of the bottom 20.

A pair of inwardly extending arcuate flanges 54 are provided for engaging the upper surface of the side edges of the conveyor chain for holding the conveyor chain adjacent the upper surface of the inclined bottom 20 and especially holding the lower portion of the conveyor chain in generally a horizontal plane for receiving the vegetables or potatoes from the shovel 32. A transverse extending rock shield 56 is provided in underlying relation to the return run of the conveyor chain wherein the rear end of the rock shield 56 is curved downwardly as designated by the numeral 58 thereby preventing the return run of the conveyor chain from engaging the supporting surface and from picking up rocks or stones from the supporting surface. The forward end of the rock shield 56 curves upwardly as designated by the numeral 60 for juncture with the horizontal flange 30 thereby forming a complete closure for the side walls 14 and 16 and completely enclosing the lower portion of the conveyor chain except the upper surface thereof which receives the potatoes from the shovel 32.

The upper end of the conveyor chain is entrained over a pair of sprocket gears 62 mounted on a transverse shaft 64 supported on rearwardly extending frame members 66 having bearing members 68 mounted thereon. Immediately forwardly of the sprockets 62 is provided a pair of rollers 70 which underlie the return run of the conveyor chain for retaining the conveyor chain in a taut condition wherein the rollers 70 may be adjusted if desired for maintaining tension on the conveyor chain or the bearing 68 may be adjustable for maintaining tension on the conveyor chain.

For driving the sprocket 62, an electric motor 72 is mounted on the upper end of the end frame members 12 with a control switch 74 being provided and a suitable electrical conduit connected to the switch 74 for connection to a source of electrical energy with the conduit being omitted whereby the motor 72 drives an output shaft 76 having a V-belt pulley 78 mounted thereon which receives an endless V-belt 80 thereover wherein the V-belt 80 is also entrained over an enlarged pulley 82 mounted on a transverse lay shaft 84 which extends through the members 14 and 16. The other end of the lay shaft 84 is disposed on the opposite side of the apparatus and includes a V-belt pulley 86 secured thereto which is in alignment with an enlarged V-belt pulley 88 mounted on one end of the transverse shaft 64 having the sprocket 62 mounted thereon. An endless V-belt 90 encircles the pulleys 86 and 88 in a normally loose manner so that driving force will not be transmitted therebetween.

For properly tensioning the V-belt 90, a roller 92 is journaled on an elongated handle member 94 having one end terminally pivotally mounted on one of the upright rails 12 by a pivot pin 96 wherein the roller 92 is in engagement with the outer surface of the V-belt 90 so that pivotal movement of the handle 94 will cause selective tensioning and loosening of the V-belt 90 for causing selective transmission of rotational force from the pulley 86 to the pulley 88 thereby selectively driving the shaft 64.

An elongated tension coil spring 98 is disposed between the handle 94 and a bracket 100 on the side wall 14 for providing constant tension on the belt 90 wherein the handle 94 may be grasped and the tension of the spring 98 overcome for moving the roller 92 away from the belt 90 thereby permitting the belt 90 to slip on the pulley 86 or the pulley 88 which effectively forms a clutch for selectively driving the conveying mechanism generally designated by the numeral 42.

The end of the shaft 64 remote from the enlarged pulley 88 is provided with an offset arm 102 having a connecting link 104 pivotally mounted to the outer end thereof wherein the offset arm 102 rotates with the shaft 64 thereby rotating one end of the link 104 in a circular path defined by the radius of the arm 102. The outer end of the link 104 is pivotally connected to an elongated walking beam 106 by pivot bolt 108 wherein the central portion of the walking beam 106 is connected to a transversely disposed mounting rod 110 which projects through a bearing 112 in the walking beam 106 with fastening members 114 retaining the walking beam 106 on the supporting rod 110 whereby the upper end of the beam 106 will be caused to swing in a vertical plane substantially about a horizontal axis defined by the mounting rod 110. This oscillatory pivotal movement of the upper end of the walking beam 106 will be transmitted to the lower end thereof with the movement of the lower end being less in scope since the pivot point or rod 110 is closer to the lower end of the walking beam than to the upper end.

Supported on the lower end of the walking beam 106 is a foot pedal 116 which is pivotally attached thereto by a pivot pin 118 and provided with a downwardly sloping free end 120 wherein the upper surface of the foot pedal 116 may be engaged and depressed by exerting foot pressure thereon so that the downwardly sloping end 120 will engage the supporting surface whereby oscillation of the walking beam 106 will cause the entire apparatus to vibrate forwardly inasmuch as the entire machine may be pushed forwardly by the use of the handle bar 122. The foot pedal 116 is provided with a spring device 124 for urging the same to retracted position out of contact with the supporting surface.

In practical operation of the invention, the shovel 32 is shoved along the supporting surface by the handle bars 122 and underneath of a pile of potatoes so that the potatoes will be moved onto the lower end of the conveyor chain due to forward vibration of the entire machine caused by depressing the foot pedal 116. The potatoes are carried upwardly along the conveyor surface and are dropped downwardly from the upper end thereof onto a grading machine or into a container such as a bag or the like and suitable supporting means may be provided for containers or the like. Also, protective plates 126 may be provided for covering the sprocket 62, eccentric arm 102 and link 104 to prevent accidental injury by these parts of the machine which are adjacent to the operator. By employing this device, potatoes or similar types of vegetables may be quickly and easily elevated from a supporting surface to an elevated position for sorting or grading or for positioning in containers whether they be flexible sacks or rigid boxes or cartons thereby facilitating the handling of such vegetables.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A vegetable conveying and shoveling device comprising a mobile frame, an endless conveyor mounted on said frame in inclined relation with the lower end disposed forwardly on the frame, a guide shovel extending forwardly from the lower end of the conveyor for guiding vegetables onto the lower end of the conveyor, means for driving said conveyor, motor actuated means for propelling the frame forwardly and vibrating the same for scooping vegetables onto the shovel and the conveyor, said propelling and vibrating means including a beam pivoted to said frame, means to oscillate said beam, and means under the control of an attendant for providing a reaction against which said beam operates to push the frame forward.

2. A vegetable conveying and shoveling device comprising a mobile frame, an endless conveyor mounted on said frame in inclined relation with the lower end disposed forwardly on the frame, a guide shovel extending forwardly from the lower end of the conveyor for guiding vegetables onto the lower end of the conveyor, means for driving said conveyor, motor actuated means for propelling the frame forwardly and also vibrating the same for scooping vegetables onto the shovel and the conveyor, said guide shovel including a thin pointed plate having rounded outer edges, said plate being hingedly connected to the front of the frame for permitting the plate to slide along a supporting surface and under vegetables supported thereon, the rear end of said plate being disposed at the lower end of the conveyor for depositing vegetables thereon.

3. A vegetable conveying and shoveling device comprising a mobile frame, an endless conveyor mounted on said frame in inclined relation with the lower end disposed forwardly on the frame, a guide shovel extending forwardly from the lower end of the conveyor for guiding vegetables onto the lower end of the conveyor, means for driving said conveyor, motor actuated means for propelling the frame forwardly and also vibrating the same for scooping vegetables onto the shovel and the conveyor, said endless conveyor including a plurality of generally U-shaped rods having hooks on the free ends of the legs with the hooks on one member being engaged with the juncture between the legs and the bight portion of an adjacent member thereby forming a continuous conveyor chain, and an upstanding slat on certain of said members extending transversely of the conveyor for preventing vegetables from rolling down the inclined conveyor.

4. The combination of claim 3 wherein said conveyor has an upper shaft carried by said frame, a pair of drive sprockets secured to said upper shaft, the upper rear end of said conveyor chain entrained over said pair of drive sprockets, said drive means for the conveyor including an electric motor, a speed reduction and clutch system driven by said motor and driving said upper shaft to rotate said sprockets.

5. The combination of claim 3 wherein there are side guides extending inwardly from each side of said frame, said conveyor chain engaging said guides for retaining the lower portion of the conveyor in generally horizontal disposition.

6. A vegetable conveying and shoveling device comprising a mobile frame, an endless conveyor mounted on said frame in inclined relation with the lower end disposed forwardly on the frame, a guide shovel extending forwardly from the lower end of the conveyor for guiding vegetables onto the lower end of the conveyor, means for driving said conveyor, means for propelling the frame forwardly and vibrating the same for scooping vegetables onto the shovel and the conveyor, said means for vibrating the frame including a beam mounted generally vertically on the frame for swinging movement about a substantially central horizontal axis, means connected to the conveyor drive means for oscillating the upper end of the beam, and a pivotal foot plate on the lower end of the beam for engagement with the supporting surface to propel the frame.

7. The combination of claim 6 wherein said foot plate is provided with a downwardly sloping rear end for moving the frame forwardly during vibration thereof.

References Cited in the file of this patent

UNITED STATES PATENTS

| | | |
|---|---|---|
| 613,762 | Gahm | Nov. 8, 1898 |
| 991,148 | Goldman | May 2, 1911 |
| 1,069,258 | Horanszky | Aug. 5, 1913 |
| 1,193,124 | Copley | Aug. 1, 1916 |
| 1,275,808 | Wentz | Aug. 13, 1918 |
| 1,646,452 | Gronke | Oct. 25, 1927 |
| 1,788,995 | Fuerstenau | Jan. 13, 1931 |
| 1,818,550 | Glasier | Aug. 11, 1931 |